United States Patent [19]

Kenney et al.

[11] Patent Number: 4,653,769
[45] Date of Patent: Mar. 31, 1987

[54] PORTABLE DOCK FOR TRAILER TRANSPORTABLE BOATS

[76] Inventors: Stephen J. Kenney; Kirby Kenney, both of P.O. Box 330, Hardin, Mont. 59034

[21] Appl. No.: 749,823

[22] Filed: Jun. 28, 1985

[51] Int. Cl.⁴ ............................................. B62D 33/02
[52] U.S. Cl. ................................................... 280/414.1
[58] Field of Search ............... 280/414.1, 414.2, 414.3, 280/656; 114/344; 296/181, 182, 26; 14/2.4, 2.6, 71.1; 182/115; 440/11

[56] References Cited

U.S. PATENT DOCUMENTS 3,332,388 7/1967 Moraski .................................. 440/11
4,347,638 9/1982 Weaver .................................. 14/71.1

FOREIGN PATENT DOCUMENTS 401984 2/1943 Italy ...................................... 280/656
1098848 1/1968 United Kingdom .................. 440/11

Primary Examiner—Sherman D. Basinger
Attorney, Agent, or Firm—Kerkam, Stowell, Kondracki & Clarke

[57] ABSTRACT

A portable docking apparatus comprises two decking sections pivoted at their respective ends with each other so that one can be extended from the other as a ramp thereto and folded thereover when not in use, one of the sections has its side portion pivoted to the side of a boat trailer so that it can extend therefrom as a platform for access to the side of the boat, or it can be folded towards the interior of the trailer in a stored position together with the decking section folded thereover.

4 Claims, 2 Drawing Figures

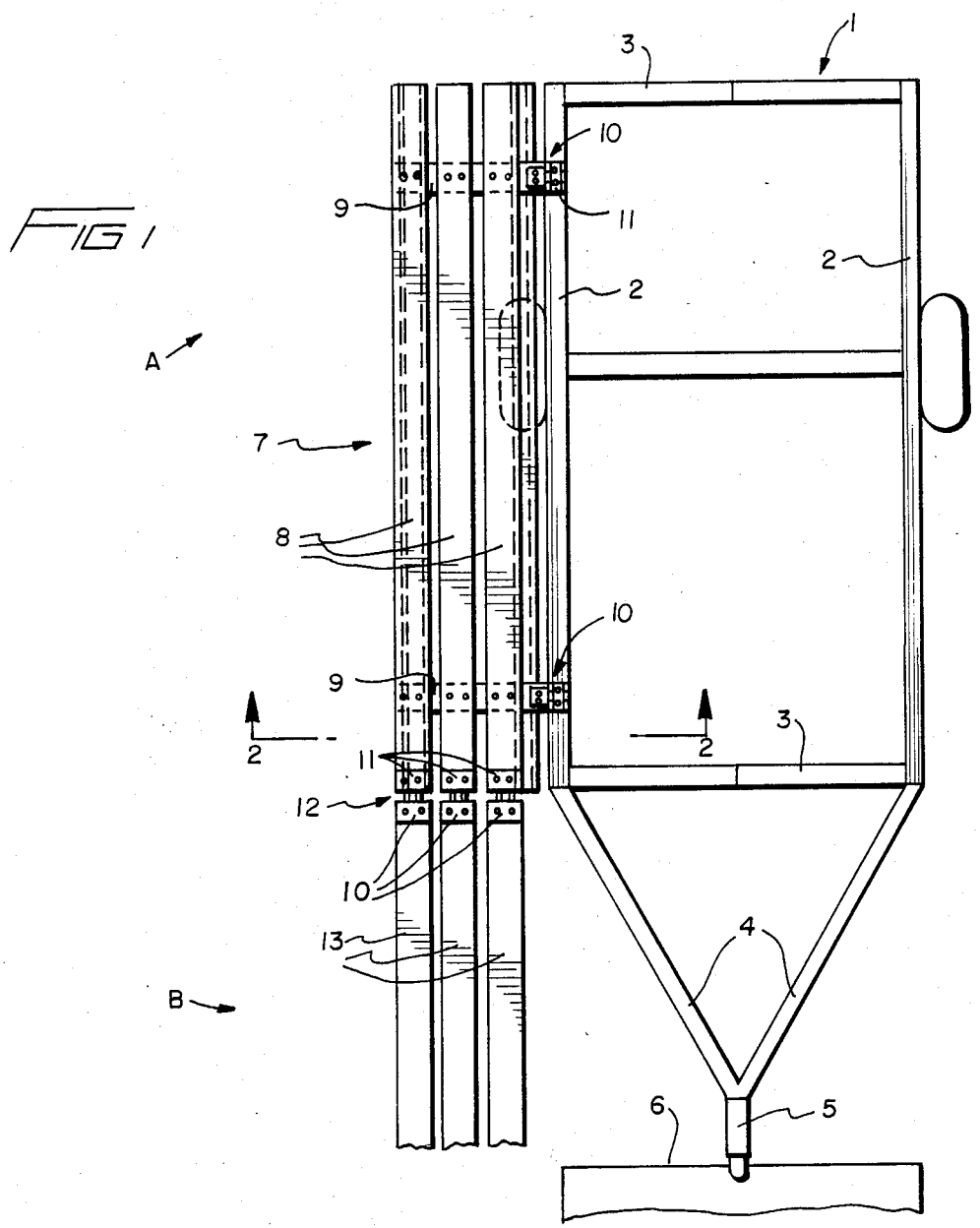
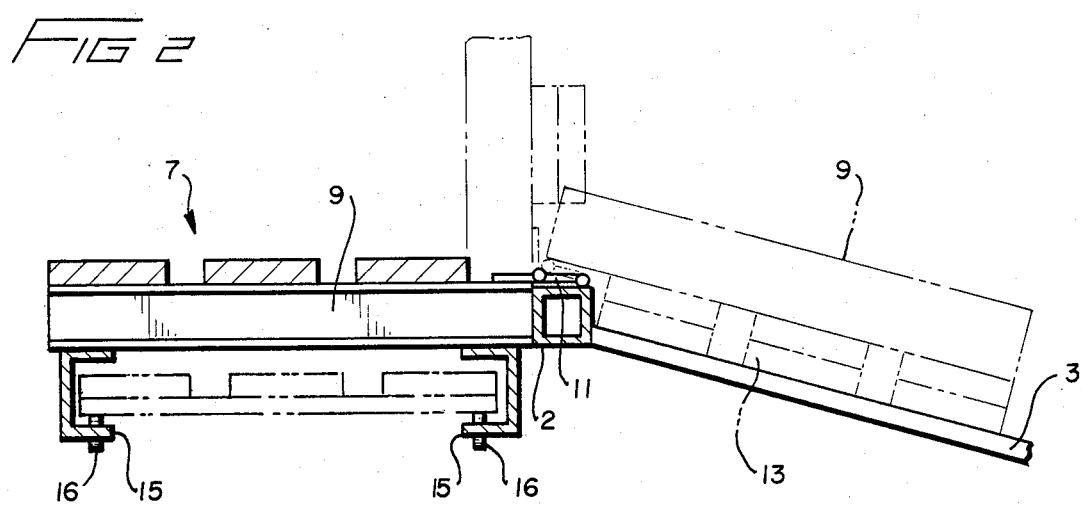

PORTABLE DOCK FOR TRAILER TRANSPORTABLE BOATS

BACKGROUND OF THE INVENTION

The present invention relates to docks for boats, particularly small boats within the range of 15 to 25 feet which can be transported by boat trailer attached to a conventional vehicle, such as a car or small truck. Such boats are often used by the day-tripper or weekend vacationer who drives directly to the waterfront, backs the boat via the trailer into the water, disengages the boat from the trailer and then attempts to embark. In such circumstances, however access to the boat is difficult because the boat is elevated in the trailer and there is no readily available platform from which to reach the boat dock. Normally the person or persons wishing to use the boat would have to negotiate the trailer itself, balancing themselves on what articulated structure there is to conventional trailers and attempting to jump or climb therefrom onto the boat—a precarious business at best. Another alternative, of course, is for the person to wade into the water and from there climb onto the boat. Needless to say, these methods of embarkation leave much to be desired and thereby create the need for a sensible and reliable form or embarkation under the circumstances and one which is perferably portable, i.e., can be carried conveniently with the trailer during transport of the boat.

SUMMARY OF THE INVENTION

It is the main object and general purpose of the present invention to provide a portable docking apparatus which can be attached to a conventional trailer and used as a platform for access to the boat at the waterfront site. The invention further contemplates that the docking apparatus be transported by the trailer along with the boat in a stored or folded position in which no extraneous dimensions are added to the trailer by the docking apparatus. It is also an object of the inventive concept to allow for easy preparation of the docking apparatus into an operating condition once the boat is ready to be boarded. By means of the docking apparatus according to the invention a person can step directly onto the dock from dry land and walk out and onto the boat without fear of slippage or the exercise of acrobatic skills and without getting wet.

According to the principles of the invention there is provided a docking apparatus comprising a decking section which is attached to the side of a conventional boat trailer. The decking section is also connected at one of its ends to a second, comparable decking section extension which can be folded back on top of the first section or folded out away from the first section and towards the vehicular end of the trailer to form a ramp leading to the first section. The extension can be connected to the decking section by a hinged connection or a suitable latch mechanism to enable its ready disassembly. The decking apparatus can be folded against the hull of the boat, or may be folded inwardly onto the trailer frame before the boat is stored on the trailer.

The invention will be better understood as well as further objects and advantages thereof become more apparent from the ensuing detailed description taken in conjunction with the drawings.

BRIEF DESCRIPTION OF THE DRAWINGS

FIG. 1 is a plan view showing the docking apparatus according to the invention attached to the side of a conventional boat trailer in which the docking apparatus is in the open, operative position: and FIG. 2 is a schematic cross sectional view of the docking apparatus showing it in its folded positions and extending positions.

DETAILED DESCRIPTION

Referring now to FIG. 1, there is shown a boat trailer 1 of conventional design having a generally rectangular structure comprising a pair of spaced apart angle iron bars 2 and cross bars 3. The cross bars 3 may be straight or V-shaped to accommodate the hull of the boat, as shown in dotted lines. More conveniently, the cross bar may support a boat cradle, not shown, in which the boat to be transported nests. As can be readily appreciated, depending on the size of the boat the sides and top of the sides of the boat which must be scaled for access to the deck can be several feet off the ground. At the vehicular or front end of the trailer 1 there are normally provided a pair of converging bar members 4 which are attached to conventional connecting bar 5 for engaging a suitable counter connection or hitch on the vehicle 6.

The docking apparatus itself is shown as 7 and is seen to border one side of the trailer, although it is contemplated by the principles and spirit of the invention to provide a second or docking apparatus on the opposite side of the trailer 1, as shown in dotted lines, to provide a dual dock.

Reference to the docking apparatus 7 can, of course, equally apply to a second docking apparatus provided on the opposite side of the trailer because they would be identical except one would pivot clockwise for strorage and the other would pivot counterclockwise for storage. Each docking apparatus preferably comprises two or more (only two being shown) sections A and B. Each section is made up of several spaced slats or plank members, 8 and 13 respectively, three being shown to form a platform. The platform could, however, be a solid piece. The platform may be constructed from treated or other water resistant material and is of suitable thickness and width such as to afford support for several persons. In the illustrated embodiment, the plank members are spaced apart from each other, as shown, and bolted to mounting brackets 9 which may be aluminum or steel in the form of an I-shaped channel. Two such mounting brackets are shown supporting the first section A, and depending on the length of the second section B (which may be of equal length to A) one or two brackets can be provided in a similar manner.

The two sections A and B can be connected in any convenient manner. For example, the mating ends of section A and section B may be provided, with detachable coupling means 12 either of the bayonet or hook type by which one section may be fastened to the other, while still being capable of disassembly in a rapid fashion. Alternatively, coupling 12 may be a hinge which connects the adjacent ends of the respective planks 8 and 13. In either case, coupling elements 10 and 11 on sections B and A are provided to support one section to the other. The hinge connection allows section B to be folded back over section A. If a third section is used, a similar detachable or hinge connection would be provided between adjacent ends of the second and third sections.

In another alternative construction, sections A and B may represent the two sections of sliding members similar to an aluminum extension ladder in which case section B would be capable of movement along the axis of section A, section A having suitable dependency brackets 15 to allow section B to be slid beneath planks 8 and conveniently stored thereunder. Suitable rollers 16 may be included on Section B.

As further shown in FIG. 1, the mounting brackets 9 extend the width of the platform before making hinged connection to suitable mounting plates 11' on the bar member 2. This free space between the side of the platform nearest the bar 2 and the bar itself allows for the platform to clear the bar 2 when the entire docking apparatus 7 is pivoted by means of the hinges 10' on the mounting plates 11' towards the interior of the trailer 1. When the boat is not in the cradle, the docking apparatus 7 can be swung against bars 3, and in order to achieve that purpose, conventional double hinges may be provided on the mounting plates 11' so that the entire structure can be pivoted below the horizontal. Double hinges are readily available commercially and are designed to provide rotation through and beyond 180 degrees.

FIG. 2 shows the docking apparatus 7 extended from the side bar 2 of the trailer 1 in solid lines. The mounting support or bracket 9 is shown juxtaposed against the side bar 2 for maintaining the dock in a horizontal position by virtue of the end face of the bracket 9 contacting the side bar 2. Additional supports extending from the frame may be provided to support the decking section. Any weight on the deck section A is then transferred as a compression force against the side bar 2 and hence against the trailer itself. It should be understood that too wide a deck section A would place too great a strain on the connecting hinges, given the weight of a person placed on the extreme outer edge. It is for this reason then that the deck section A is relatively narrow with respect to its length. It has been found, for example, that three boards spaced ⅜ inches apart and each having the dimension of 2×6 inches provides an overall optimum width of about 19" for section A and enables safe operation of the docking assembly.

As further shown in FIG. 2 in dotted lines, the assembly or apparatus 7 can be folded to the vertical position, in which case the assembly would rest against the hull of the boat when the same is stored on the trailer 1. In this case, the mounting brackets or plates 11' would only need a single hinge member to operate properly. With the provision of a double hinge member for the mounting plates 11', the docking assembly 7 can then fold further towards the interior of the trailer 1, drop below the horizontal and rest on the V-shaped cross bar members 3. If the platform is stored for transport in the upright position, a suitable lock or locking clamp (not shown) may be used to clamp the platform to the trailer. It should be noted that in the stored position only the depth of the channel member 9 extends beyond the edge of the trailer during transport and if the platform is swung inwardly to rest on bars 3, the transport dimension (width) of the trailer is unchanged.

While the platform is shown as constructed of planks or boards, 8 and 13, it is also contemplated that the entire assembly 7, including the planks, could be constructed of a fiberglass reinforced material, plastic, metal, or metal alloy which would provide both light weight and strength.

The operation of the assembly 7 is as follows. Once the boat has been removed from the trailer at the waterfront site, the assembly 7, assuming it is resting on the cross bars 3, is then unfolded to its extended position, as shown in FIG. 1. The deck section B is then folded forward or slidingly extended outward (in the rollers) towards the vehicular end of the trailer until its free end rests on the ground or beach near the water. The section B thus provides a ramp upon which the user can walk up to section A, and thus walk therealong to where the boat has been placed in the water. From that end location on the section A nearest the water, embarkation is readily simple and safe. Once the boat is in the water, it can approach the assembly which is used as a dock.

If the assembly 7 is secured to the side of the boat during transit thereof, then the assembly 7 is first released from its secured position and unfolded or pulled out to its extended position before the boat is removed from the trailer. In this way the assembly can be used as a dock from which to facilitate removal of the boat into the water before embarking the boat.

It should be understood that the length of the assembly 7 can vary according to the trailer size and the boat size. Advantageously, the length of the assembly should approximate the length of the trailer for access to entire side of a boat cradled on a trailer.

The foregoing relates to preferred embodiments of the invention; it being understood that other embodiments and variants thereof are possible within the spirit and scope of the invention, the latter being defined by the appended claims.

What is claimed and desired to be secured by Letters Patent of the United States is:

1. A portable docking apparatus for use with a vehicular drawn boat trailer comprising: a first decking assembly of generally rectangular shape and having a length substantially equal to that of a side section of said trailer, said first decking assembly having at least two supporting members attached to an extending transversely under said first decking assembly, hinges pivotally attaching said supporting members to a side section of said trailer to allow said first decking assembly to extend horizontally outwardly from said side section and be pivoted inwardly and vertically oriented adjacent the side section of the trailer, said first decking assembly being braced in said outward position by cantilever support of said support members, said cantilever support provided by abutment of said support members against said side section of said trailer, and by said hinges connecting said support members and said section; and a second decking assembly of generally rectangular shape, said second decking assembly having one end thereof mounted to a corresponding end of said first decking assembly nearest the vehicular end of said trailer, and means for selectively positioning said second decking assembly as a longitudinal extension from said first decking assembly to provide a ramp thereto and retracting said second decking assembly from its ramp position to a storage position and thereafter enabling pivoting of said first and said second assembly inward over said side section and onto said trailer for storage.

2. A portable docking apparatus as set forth in claim 1, wherein said positioning means are brackets depending from said first decking assembly and adapted to slidingly receive said second decking assembly for storage thereunder.

3. A portable docking apparatus as disclosed in claim 1 wherein each of said first and second decking assemblies comprises at least two longitudinally oriented, parallel, spaced apart boards, said second decking assembly further having at least one supporting member attached and extending transversely under said boards.

4. A portable docking apparatus as disclosed in claim 1 wherein crossbars of said boat trailer are v-shaped and said hinges are double hinges thereby allowing said first and second decking assemblies, when in a retracted position, to pivot inwardly below the horizontal and come to rest on said v-shaped crossbars.

* * * * *

UNITED STATES PATENT AND TRADEMARK OFFICE
CERTIFICATE OF CORRECTION

PATENT NO. : 4,653,769

DATED : March 31, 1987

INVENTOR(S) : Kenney et al

It is certified that error appears in the above-identified patent and that said Letters Patent is hereby corrected as shown below:

Column 4, Claim 1, line 40, "an" should read -- and --.

Column 4, Claim 1, line 52, after "said" insert --side--.

Signed and Sealed this

Second Day of February, 1988

Attest:

DONALD J. QUIGG

Attesting Officer

Commissioner of Patents and Trademarks